Aug. 16, 1932.   L. GOLDHAMMER   1,871,983

ATTACHMENT OF MOVING PICTURE FILM TO THE FILM SPOOL

Filed Jan. 22, 1929

Patented Aug. 16, 1932

1,871,983

UNITED STATES PATENT OFFICE

LEO GOLDHAMMER, OF MUNICH, GERMANY, ASSIGNOR TO AGFA ANSCO CORPORATION, OF BINGHAMPTON, NEW YORK, A CORPORATION OF NEW YORK

ATTACHMENT OF MOVING PICTURE FILM TO THE FILM SPOOL

Application filed January 22, 1929, Serial No. 334,262, and in Germany January 25, 1928.

The present invention relates to a method of attaching the end of a moving picture film strip to the core of a film spool, and to motion picture film strips and film spools suitable for this method.

Hitherto this attachment has been by means of a blade spring or similar clamping device on the core of the spool. This necessitated sharply bending the film incurring liability of breakage, or the film clamped to the spool core by a spring has no fixed attachment but is only connected by friction, so that it can be detached by a strong pull.

I found that these disadvantages are avoided by making one or several incisions between the perforations of the film band, of such shape that by bending the film there are formed projecting tongues directed away from the film end which tongues engage, automatically from below, in a corresponding slot in the spool core or a part belonging thereto when the film is somewhat retracted. The film may be curved by inserting it in a fissure-like curved guide way, for instance between the spool core and a curved blade spring fixed thereto and having a corresponding slot for engaging one of the film-tongues.

Figure 1:
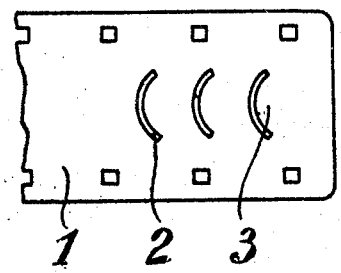
Figure 2:
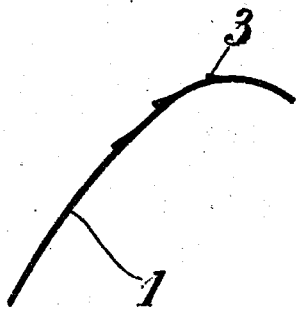
Figure 3:
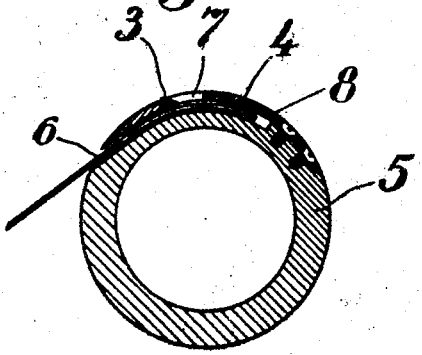

In the accompanying drawing an example of the invention is illustrated, Fig. 1 representing the end of the film strip 1, with a number of arc-shaped incisions 2, while Fig. 2 shows in section the strip curved so as to produce the tongues 3. Fig. 3 is a cross section of a spool core 5 with the end of a film strip inserted in the slot 6 and the curved channel 8, which is formed by a curved metal blade 4 attached to the spool core. This blade has a cut out slot 7 in which engages from below the projecting tongue 3 of the film strip.

I claim:

1. In a cinematographic film roll a film strip provided near one end between the perforations with an arc-shaped incision which forms on the bent film a projecting tongue directed away from the end of the film strip.

2. In a combined cinematographic film roll and spool, a spool core, a curved channel in said core, a slot in the outer or peripheral blade defining said channel, a perforated film strip having its end portion inserted within said curved channel, said film strip being provided near its end and between the perforations thereof with one or more incisions whereby projecting tongues, directed away from the end of the film strip, are formed when the film is bent, one of said tongues being in engaging relation with said slot.

3. In a combined cinematographic film roll and spool, a spool core, a curved metal apron or blade secured to the periphery of said spool and forming a channel between the apron and the spool, a slot in the apron, a perforated film strip having its end portion inserted within said curved channel, said film strip being provided near its end and between the perforations thereof with one or more incisions whereby projecting tongues, directed away from the end of the film strip, are formed when the film is bent, one of said tongues being in engaging relation with said slot.

4. A film spool for holding cinematographic films comprising a spool core, an apron or blade upon the periphery of said spool core, a channel or fissure-like opening between the spool core and the apron or blade, a slot in said apron or blade for engaging raised tongues of a bent incised film strip.

In testimony whereof, I affix my signature.

LEO GOLDHAMMER.